(12) United States Patent
Rolland et al.

(10) Patent No.: US 10,953,700 B2
(45) Date of Patent: Mar. 23, 2021

(54) TREAD FOR HEAVY-GOODS VEHICLE TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Maxime Rolland, Clermont-Ferrand (FR); Fabien Marlier, Clermont-Ferrand (FR); Ronald Cress, Greenville, SC (US); Ralston Moore, Greenville, SC (US)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 526 days.

(21) Appl. No.: 15/115,357

(22) PCT Filed: Feb. 2, 2015

(86) PCT No.: PCT/EP2015/052038
§ 371 (c)(1),
(2) Date: Jul. 29, 2016

(87) PCT Pub. No.: WO2015/114129
PCT Pub. Date: Aug. 6, 2015

(65) Prior Publication Data
US 2017/0001478 A1 Jan. 5, 2017

(30) Foreign Application Priority Data
Feb. 3, 2014 (FR) ...................................... 1400296

(51) Int. Cl.
| | | |
|---|---|---|
| *B60C 11/12* | (2006.01) | |
| *B60C 11/03* | (2006.01) | |
| *B60C 11/04* | (2006.01) | |

(52) U.S. Cl.
CPC ........ *B60C 11/1236* (2013.01); *B60C 11/033* (2013.01); *B60C 11/0306* (2013.01);
(Continued)

(58) Field of Classification Search
CPC . B60C 11/0323; B60C 11/1281; B60C 11/04; B60C 11/042; B60C 11/033;
(Continued)

(56) References Cited

U.S. PATENT DOCUMENTS

| | | | | |
|---|---|---|---|---|
| 2,186,180 A | * | 1/1940 | Sloman | ............... B60C 11/0309 152/209.25 |
| 2011/0048603 A1 | * | 3/2011 | Kleffmann | .............. B60C 11/04 152/209.21 |

(Continued)

FOREIGN PATENT DOCUMENTS

| | | | | |
|---|---|---|---|---|
| CN | 103492196 A | | 1/2014 | |
| JP | 2009274726 A | * | 11/2009 | ........... B60C 11/032 |
| WO | 2013150143 A1 | | 10/2013 | |

OTHER PUBLICATIONS

Machine translation of JP2009-274726 (no date).*

*Primary Examiner* — Steven D Maki
*Assistant Examiner* — Philip N Schwartz
(74) *Attorney, Agent, or Firm* — Dickinson Wright PLLC; Steven Hurles

(57) ABSTRACT

The tread has a total axial width W and a wearable thickness PMU of material and has at least four grooves on each side of a midplane that divides the tread axially into two parts. The grooves divide the tread into a middle, intermediate and edge regions 6. The middle region has an axial width Lm of (Continued)

at least 30% and at most 60% of the total width W. The total volume void ratio when new is less than 17%, and the middle region has a volume void ratio that is less than half the total volume void ratio. The middle region comprises a plurality of transverse sipes opening into the grooves, and the sipes have depths at least equal to 75% of the depth of the grooves. The number of transverse sipes in the middle region is greater than the number of transverse sipes on each intermediate or edge region.

12 Claims, 2 Drawing Sheets

(52) U.S. Cl.
CPC .......... *B60C 11/0323* (2013.01); *B60C 11/04* (2013.01); *B60C 11/1259* (2013.01); *B60C 11/1281* (2013.01); *B60C 2011/0341* (2013.01); *B60C 2011/0355* (2013.01); *B60C 2011/129* (2013.01); *B60C 2011/1295* (2013.01); *B60C 2200/06* (2013.01)

(58) Field of Classification Search
CPC ............. B60C 11/0306; B60C 11/0309; B60C 11/1259; B60C 11/1236; B60C 2011/129; B60C 2011/0341; B60C 2011/0355; B60C 2011/1295; B60C 2200/06
See application file for complete search history.

(56) References Cited

U.S. PATENT DOCUMENTS

| | | | |
|---|---|---|---|
| 2011/0277898 A1* | 11/2011 | Barraud | B60C 11/0306 152/209.18 |
| 2014/0029084 A1 | 1/2014 | Kashiwagi | |
| 2014/0290814 A1 | 10/2014 | Audigier et al. | |
| 2014/0299242 A1 | 10/2014 | Chauvin | |
| 2015/0059943 A1 | 3/2015 | Radulescu et al. | |

* cited by examiner

TREAD FOR HEAVY-GOODS VEHICLE TIRE

CROSS-REFERENCE TO RELATED APPLICATIONS

The present invention claims priority to PCT International Patent Application Serial No. PCT/EP2015/052038 filed Feb. 2, 2015 entitled "Tread For Heavy-Goods Vehicle Tyre," which claims the benefit of FR Patent Application Serial No. 1400296 filed Feb. 3, 2014, the entire disclosures of the applications being considered part of the disclosure of this application and hereby incorporated by reference.

BACKGROUND OF THE INVENTION

1. Field of the Invention

The present invention relates to a tread for a tire for a heavy vehicle and more particularly to the tread pattern of such a tread for a tire intended to be mounted on a drive axle.

2. Related Art

In order to ensure both satisfactory grip and good clearing of water when driving over a roadway covered with water it is necessary to form on a tread a more or less complex system of cuts comprising a plurality of grooves and of sipes. These cuts form a tread pattern design both on the surface referred to as the tread surface that is intended to come into contact with the roadway and within the thickness of the tread.

Patent document FR 1452048 notably discloses how to form wide cuts (grooves) and narrow cuts (sipes). The latter have widths suited to their being able to close up as they enter the contact patch in which the tire is in contact with the roadway. Thus it is possible to benefit from the presence of edge corners while at the same time maintaining sufficient stiffness. A person skilled in the art has therefore to combine a necessary water-clearing volume, consisting of the volumes of voids formed notably by the grooves, with lengths of active edge corners comprising both the edge corners of the grooves and of the sipes.

Publication WO-2010072523-A1 also discloses how to form a reduced void volume when new, this void volume comprising parts intended to form new grooves once a part-worn condition is reached, these void volumes being connected to the grooves formed from new by a plurality of transverse sipes.

Document WO-A-2013/014253 discloses a tread for an off-road tire, this tread comprising circumferential grooves and transverse grooves delimiting the plurality of blocks of material.

The need has arisen to improve further the balancing act between total void volume when new and the lengths of active edge corners in the contact patch, and to do so for different levels of wear.

Definitions

A radial direction in this document means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

An equatorial midplane is a plane perpendicular to the axis of rotation and passing through those points of the tire that are radially furthest from the said axis. In the case of a tread, this plane divides the tread in its width-wise direction into two halves of equal width.

A rib is a raised element formed on a tread, this element extending in the circumferential direction and making a complete turn of the tire. A rib comprises two lateral walls and a contact face, the latter being intended to come into contact with the roadway during running.

A cut generically denotes either a groove or a sipe and corresponds to the space delimited by the walls of material facing one another and distant from one another by a non-zero distance (referred to as the "width of the cut"). It is precisely this distance that differentiates a groove from a sipe: in the case of a sipe, this distance is suited to allowing the opposing walls delimiting said sipe to come at least partially into contact at least as the sipe enters the contact patch in which the tire is in contact with the roadway. In the case of a groove, the walls of this groove cannot come into contact with one another under normal running conditions.

A tread has a maximum wearable thickness PMU of material that can be worn away during running; once this thickness is reached either the tire can be regrooved in order to ensure new grooves or the tire is replaced with another, new, tire.

The surface void volume of a tread pattern is equal to the ratio between the surface area of the voids formed by the grooves and the total surface area (contact area of the raised elements and surface area of the voids). A low void ratio indicates a large contact area of the raised elements and a small surface area of voids between these elements.

The volume void ratio of a tread pattern of a tread when new is equal to the ratio of the void volume (voids formed notably by grooves, cavities) formed in the tread and the total volume of said tread comprising the volume of wearable material and the volume of the voids. A low volume void ratio indicates a low volume of voids in relation to the volume of wearable tread material.

As the tread gradually wears, it is possible to define a remaining void volume and a volume void ratio.

The normal running conditions for the tire or service conditions are those defined notably by the ETRTO Standard or any equivalent standard depending on the country concerned; these service conditions specify the reference inflation pressure corresponding to the load bearing capacity of the tire as indicated by its load index and speed index. These service conditions may also be referred to as "nominal conditions" or "conditions of use".

The contact patch is determined with the tire stationary in conditions that may be the nominal conditions or any other set condition; from this patch it is easy to calculate a mean value for the length of the patch in the circumferential direction.

BRIEF SUMMARY OF THE INVENTION

The present disclosure seeks to propose a tread for a heavy vehicle tire, this tread having a tread pattern design that allows both an improvement in the wearing performance and a reduction in the rolling resistance while at the same time maintaining an appropriate level of grip regardless of the degree of this tread wear. This disclosure is more particularly applicable to very wide treads, namely treads of a width of at least 360 mm.

To this end, one subject of the disclosure is a tread for a heavy vehicle tire, this tread having a total width W and a wearable thickness PMU of material, this tread being provided with at least four grooves of circumferential overall orientation, these grooves dividing the tread into a middle region, intermediate regions axially on each side of the middle region and edge regions axially delimiting the tread. The middle region is defined as the region of the tread situated between the two circumferential grooves that are axially closest to the equatorial midplane. This middle region has an axial width at least equal to 30% and at most equal to 60% of the total width W of the tread. The total void volume is measured when new, including all the void volumes (grooves, voids hidden within the tread). Likewise, a total void volume when new is measured for each region defined hereinabove. These void volumes decrease with wear.

The total volume void ratio of the tread when new is less than 17% and the volume void ratio when new for the middle region is less than half the total volume void ratio of the tread when new. The total volume void ratio of the tread when new being calculated as the ratio between the total void volume and a total volume of tread including both the volume of material and the volume of all the voids, this total tread volume being evaluated between the tread surface when new and an internal surface extending in the tread parallel to the tread surface when new, this internal surface being in contact radially on the inside with those points of the deepest circumferential grooves that are furthest towards the inside of the tread.

This tread is such that the middle region comprises a plurality of transverse or oblique sipes opening into the circumferential grooves delimiting this middle region, these sipes having a depth at least equal to 75% of the depth of the circumferential grooves, the number of transverse or oblique sipes in the middle region over one complete turn of the tire being greater than the number of transverse or oblique sipes that may potentially be present on each other intermediate or edge region.

The axial width of the middle region is defined as being the mean axial distance separating the axially innermost walls of the circumferential grooves closest to the equatorial midplane. This middle region therefore has no circumferential groove that opens onto the tread surface when new.

Each intermediate region extends between an axial limit of the middle region and the axially innermost wall of the other circumferential groove axially delimiting this intermediate region. The axial width of this intermediate region is equal to the mean axial distance between these two aforementioned walls. The void volume of the intermediate region includes the volume of the groove axially inside this intermediate region.

From these demarcations of the middle region, of the intermediate regions and of the edge regions, a volume void ratio when new and also for each degree of part wear is calculated for each region in the same way as was done to obtain the void ratio of the tread.

An oblique orientation here means that each sipe of the middle part makes an angle at least equal to 45 degrees with the circumferential direction. A transverse orientation means that a sipe makes an angle equal to or close to 90 degrees with the circumferential direction.

In one advantageous alternative form, this tread is such that also each intermediate region comprises transverse or oblique sipes opening into the circumferential grooves, these sipes having a depth at least equal to 75% of the depth of the circumferential grooves, these transverse sipes being arranged at a mean spacing Pi, the mean spacing Pm of the sipes of the middle region being less than the mean spacing Pi.

In an alternative form of the disclosure, the edge regions have no transverse or oblique sipe at all.

In an alternative form of the disclosure, the edge regions are provided with transversely or obliquely oriented sipes at a mean spacing Ps, this mean spacing Ps being greater than the mean spacing Pm of the sipes in the middle region.

For preference, the mean spacing Pi of the sipes in each intermediate region is at least greater than 1.2 times the mean spacing Pm of the sipes in the middle region.

In an alternative form of the disclosure, the tread as defined further comprises, in its middle region, at least two circumferential sipes, these circumferential sipes being extended into the tread by widened parts forming channels, these channels being intended to form new grooves after the tread has become part-worn.

Advantageously, at least one of these channels appears at the tread surface when the degree of part-wear reaches at most 60% of the wearable thickness PMU of material.

In an advantageous alternative form, the volume void ratio of the tread when new is less than 13% and the volume void ratio of the middle region when new is at most equal to 6%, and more preferably still, at most equal to 5%.

The disclosure also relates to a tire provided with a tread as previously defined, this tire being more particularly—although not solely—intended to be fitted to a drive axle of a heavy vehicle.

Further features and advantages of the disclosure will become apparent from the description given hereinafter with reference to the attached drawings which, by way of non-limiting examples, show one embodiment of the subject matter of the disclosure.

BRIEF DESCRIPTION OF THE FIGURES

In order to make the figures easier to understand, the same reference signs are used for describing alternative forms of the disclosure where these reference signs refer to elements of the same nature, whether this be a structural or indeed a functional nature.

Figure 1:
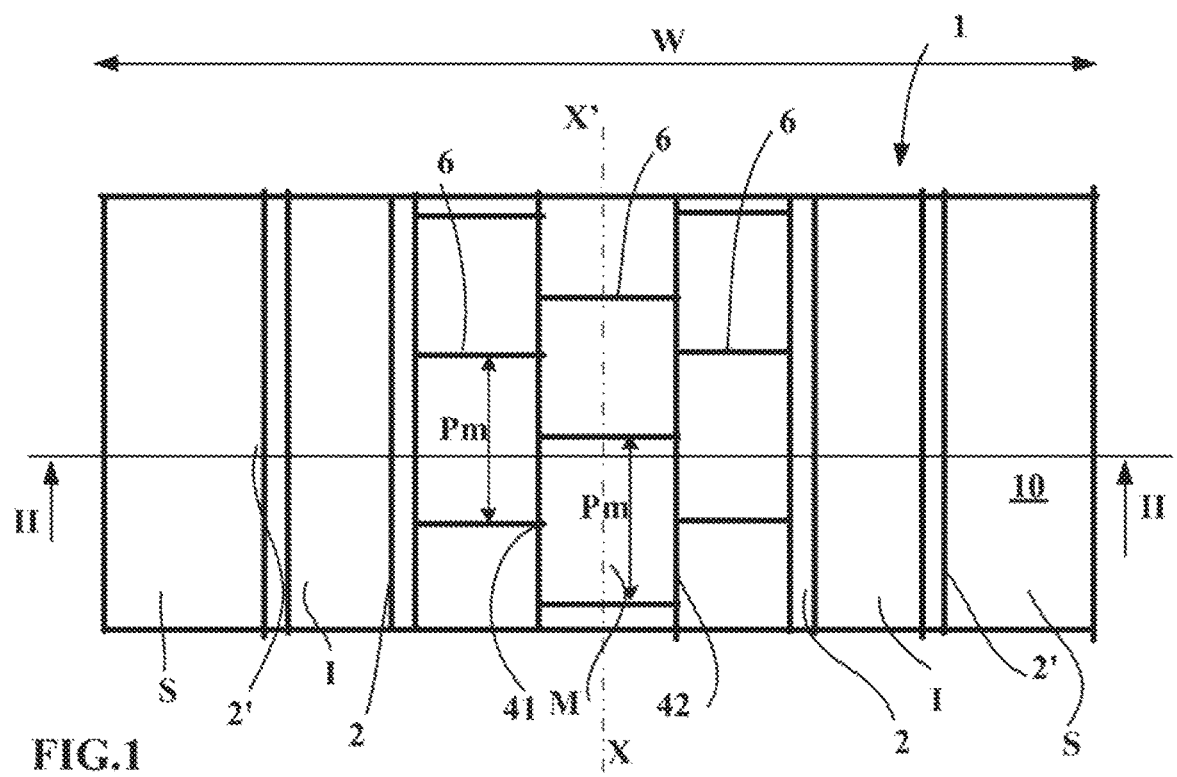
FIG. 1 is a plan view of the tread pattern design of a tread according to a first alternative form of the disclosure.

FIG. 1 is a plan view of the tread pattern design of a tread intended to be fitted to a tire of a heavy vehicle.

This tire of size 445/50 R 22.5 is intended to be fitted to the drive axle of a heavy vehicle. This tire comprises a tread 1 of which the tread surface 10 when new is shown in part in FIG. 1. This tread 1 has a width W measured in the axial direction which here is equal to 379 mm.

This tread 1 is provided with a non-directional tread pattern design comprising four grooves 2, 2' of circumferential overall orientation and having a slightly zigzag geometry; these circumferential grooves 2, 2' open onto the tread surface 10 when new and are formed on each side of the equatorial midplane indicated by its line XX' in this FIG. 1. The two circumferential grooves 2 axially closest to one another between them delimit a middle region M of which the width Lm here is equal to 145 mm (namely approximately 38% of the total width W).

Axially on the outside and on each side of the middle region M is formed an intermediate region I of mean width Li equal to 52 mm (namely 14% of the total width W) and finally an edge region S of mean width Ls equal to 65 mm (namely 17% of the total width W).

The middle region M further comprises two sipes 41, 42 of circumferential orientation opening onto the tread surface 10 when new, each of these sipes 41, 42 being extended into the thickness of the tread by channels 51, 52 respectively, these channels being intended to form new grooves after 70% wear is reached (this percentage is calculated with respect to the wearable thickness PMU of material).

In the present instance, the total volume void ratio when new is equal to 9% whereas the volume void ratio of the middle region M is equal to 3%. For the intermediate region I, the volume void ratio when new is equal to 18% and that of the edge region S is equal to 12%. The total volume void ratio is calculated when the tread is new by summing the volumes of the circumferential grooves and of the transverse grooves as well as the volumes of the channels. The volume void ratios for the middle and other regions when new are calculated as indicated earlier on in this description.

The middle region M is provided with a plurality of oblique sipes 6 extending between the two circumferential grooves 2 delimiting the middle region. These transversely oriented sipes 6 are arranged at a mean spacing Pm equal to 33 mm. These sipes 6 open into the aforementioned circumferential grooves 2 and into the circumferential sipes 41, 42 of the middle region. Furthermore, these sipes 6 open into the channels 51, 52 formed in the thickness of the tread.

The intermediate regions and the edge regions have no transverse or oblique sipes at all.

Figure 2:
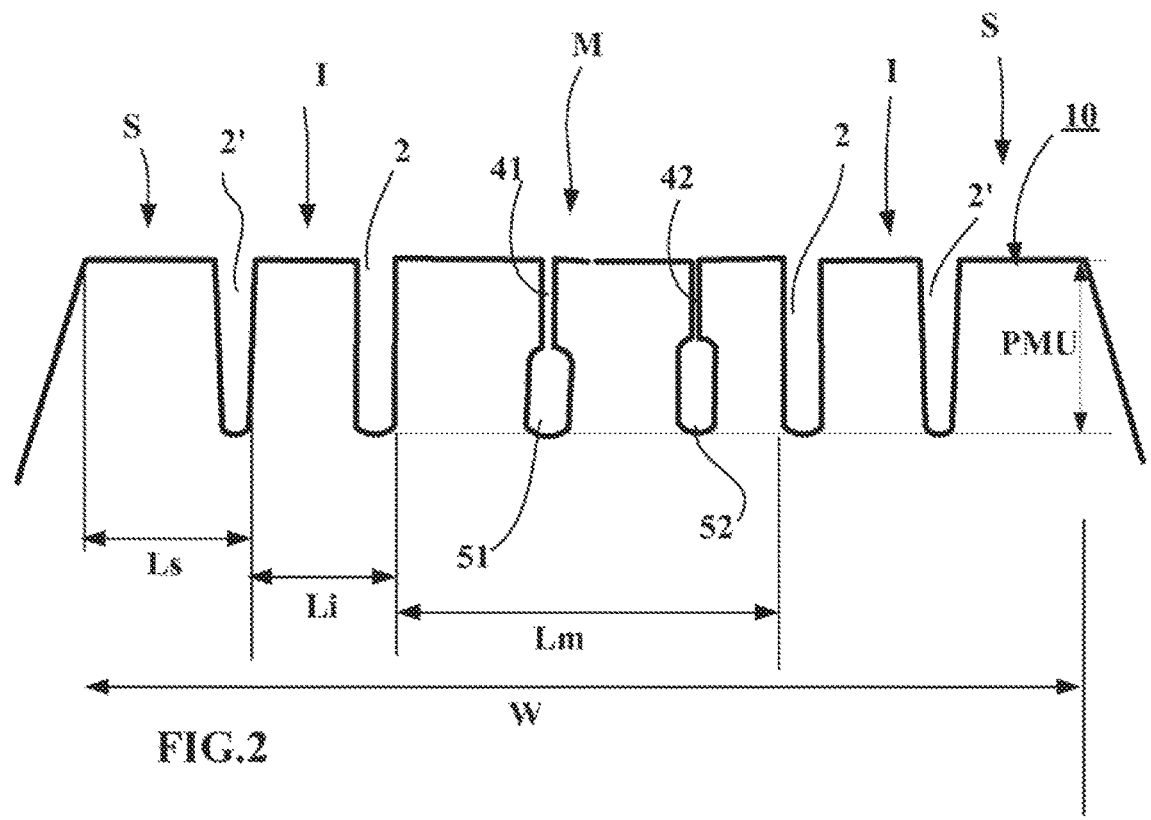
FIG. 2 is a view in cross section on a plane perpendicular to FIG. 1 and the line of which plane is embodied by the line II-II.

FIG. 2 shows a cross section of the tread shown in FIG. 1 on a plane, the line of which corresponds in this FIG. 1 to the line II-II.

In this FIG. 2 it may be seen that the channels 51, 52 are intended to form new grooves after 70% of the wearable thickness PMU has been worn away. These channels extend at maximum into the thickness as far as a level identical to that of the circumferential grooves 2, 2' so as to create new grooves until the tread is completely worn down.

After the tire has become part-worn causing these new grooves that open onto the new tread surface to appear, the distributions of volume void ratios have changed and become respectively:

4% for the middle part

10% for each intermediate region

7% for each edge region.

Figure 3:
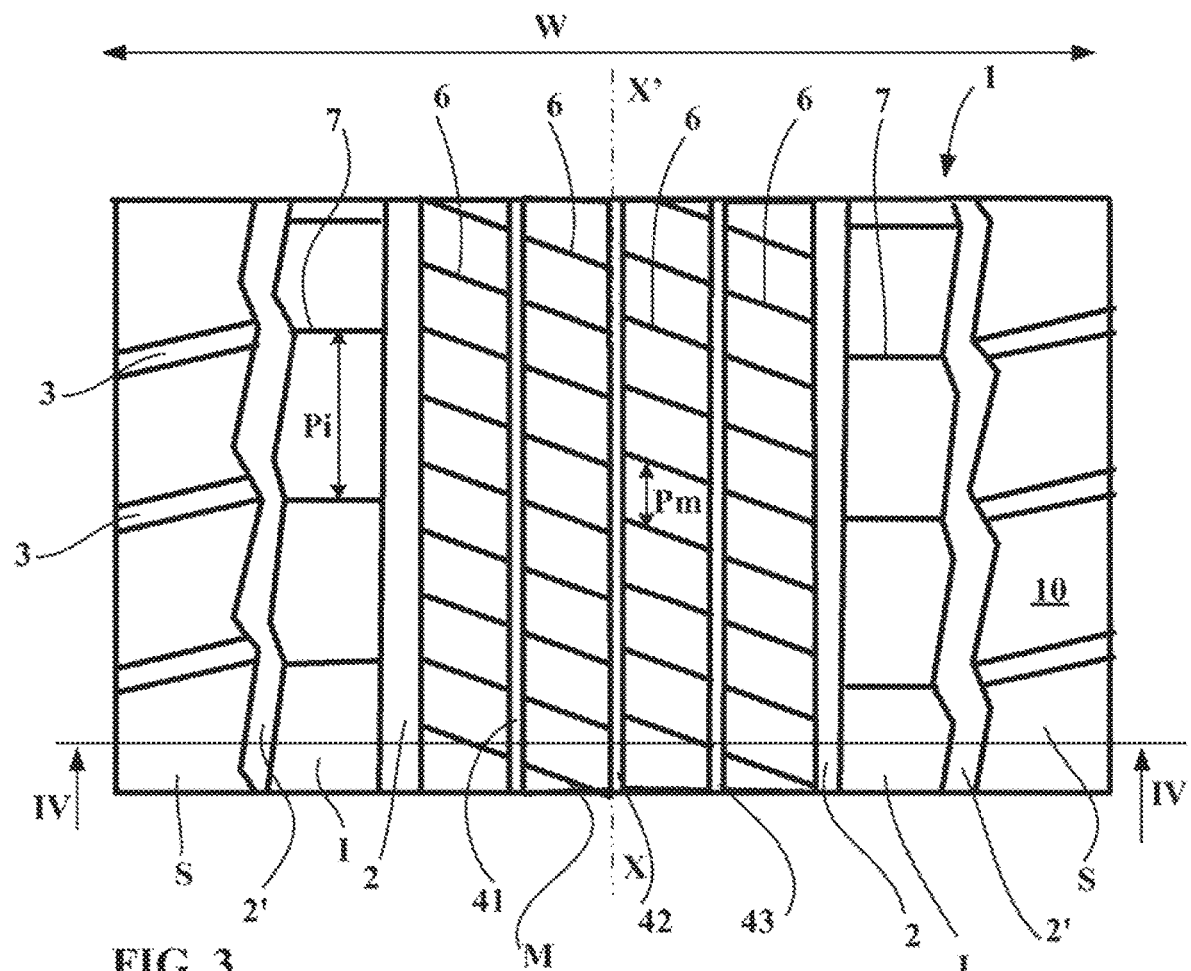
FIG. 3 is a plan view of the tread pattern design of a tread according to a second alternative form of the disclosure.

FIG. 3 is a plan view of the tread pattern design of a tread of a tire for a heavy vehicle.

This tire of size 445/50 R 22.5 is intended to be fitted to the drive axle of a heavy vehicle. This tire comprises a tread 1 of which the tread surface 10 when new is shown in part in FIG. 3. This tread 1 has a width W measured in the axial direction which here is equal to 395 mm.

This tread 1 is provided with a non-directional tread pattern design comprising four grooves 2, 2' of circumferential overall orientation, the axially outermost grooves 2' having a zigzag geometry. These circumferential grooves 2, 2' open onto the tread surface 10 when new and are formed on each side of the equatorial midplane indicated by its line XX' in this FIG. 3. The two circumferential grooves 2 axially closest to one another between them delimit a middle region M of which the width Lm here is equal to 158 mm (namely 40% of the total width W).

Axially on the outside and on each side of the middle region M is formed an intermediate region I of mean width Li equal to 54 mm (namely 13.7% of the total width W) and finally an edge region S of mean width Ls equal to 64.5 mm (namely 16.3% of the total width W).

The middle region M further comprises three rectilinear sipes 41, 42, 43 of circumferential orientation opening onto the tread surface 10 when new, each of these sipes 41, 42, 43 being extended into the thickness of the tread by channels 51, 52, 53 respectively, these channels being intended to form new grooves after 55% wear is reached (this percentage is calculated with respect to the wearable thickness PMU of material).

In the present instance, the total volume void ratio when new is equal to 12.3% whereas the volume void ratio of the middle region M is equal to 4.8%. For the intermediate region I, the volume void ratio when new is equal to 17.6% and that of the edge region S is equal to 16.2%. The total volume void ratio is calculated when the tread is new by summing the volumes of the circumferential grooves and of the transverse grooves as well as the volume of the channels. The volume void ratios for the middle and other regions when new are calculated as indicated earlier on in this description.

The middle region M is provided with a plurality of oblique sipes 6 extending between the two circumferential grooves 2 delimiting the middle region. These oblique sipes 6 are arranged at a mean spacing Pm which is identical in all the rows and equal to 27 mm. These sipes 6 open into the aforementioned circumferential grooves 2 and into the circumferential sipes 41, 42, 43 of the middle region. Furthermore, these oblique sipes 6 extend into the thickness of the tread down to a depth equal to that of the circumferential grooves and open into the channels 51, 52 formed in the thickness of the tread.

Each intermediate region I is provided with a plurality of transversely oriented sipes 7. These oblique sipes 7 are arranged at a mean spacing Pi which is greater than the mean spacing Pm of the sipes of the middle region; in the present instance, the mean spacing Pi is equal to 33 mm (the Pi/Pm ratio is equal to 1.22).

Each edge region S comprises a plurality of grooves 3 of shallow depth; these obliquely oriented grooves 3 are intended to disappear, in the present instance, when partial tread wear equals 6% (ratio calculated with respect to the total wearable thickness PMU of material). These grooves 3 are arranged circumferentially with a spacing identical to the mean spacing Pi of the sipes 7 of the intermediate region.

Figure 4:
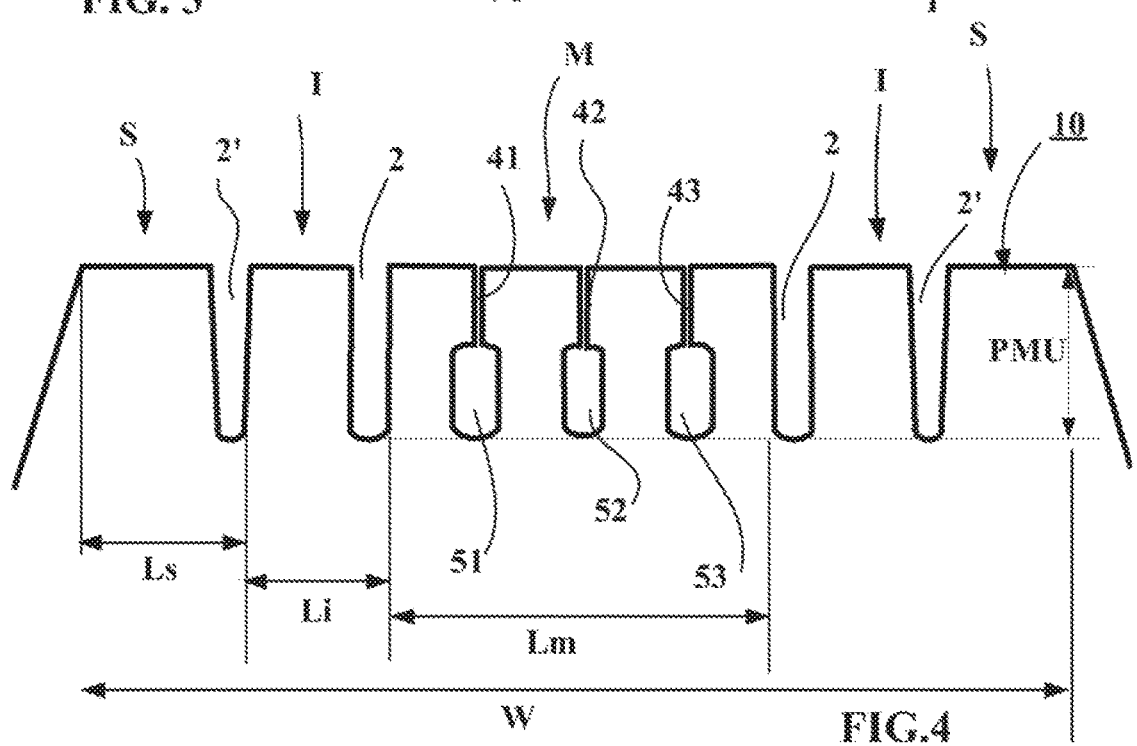
FIG. 4 is a view in cross section on a plane perpendicular to FIG. 3 and the line of which plane is embodied by the line IV-IV.

FIG. 4 shows a view in cross section of the tread shown in FIG. 3 on a plane the line of which corresponds to the line IV-IV in this FIG. 3.

In this FIG. 4 it may be seen that the channels 51, 52, are intended to form new grooves after the wear reaches substantially 50% of the thickness PMU. These channels extend in the depth of the tread down to a level equal to that of the grooves 2, 2' opening onto the tread surface when new.

After partial wear that causes these new grooves that open onto the new tread surface to appear, the distributions of volume void ratios have changed and become respectively:

8.4% for the middle part 13.6% for each intermediate region 11.1% for each edge region.

Thanks to the arrangements according to the disclosure that were described notably with reference to these two alternative forms, it has been possible appreciably to improve the behaviour in terms of wear and rolling resistance while at the same time maintaining a suitable level of grip regardless of the degree of tread wear.

The disclosure which has been described with the support of these two embodiments must not of course be restricted to these embodiments and various modifications can be made thereto without departing from the scope as defined by the claims.

What is claimed is:

1. A tread for a heavy vehicle tire,
    said tread having a total axial width W and a wearable thickness PMU of material,
    said tread being provided with at least four grooves of circumferential overall orientation on the tread, wherein the at least four grooves are spaced apart axially and disposed on both sides of a midplane that divides said tread axially into two parts of equal width, the at least four grooves including a pair of inner grooves and a pair of outer grooves,
    said at least four grooves of circumferential overall orientation dividing said tread into a middle region, intermediate regions axially on each side of said middle region and edge regions axially delimiting said tread,
    said middle region being defined as a region of said tread situated between the inner grooves, the inner grooves being the two circumferential grooves that are axially most closely spaced on each side of said midplane, said intermediate region including the inner grooves, and said edge regions including the outer grooves,
    said middle region having an axial width Lm at least equal to 35% and at most equal to 60% of said total width W of said tread,
    a total volume void ratio of said tread when new is more than 10% and less than 17%, said void ratio being calculated as a ratio between a total void volume and a total volume of tread including all voids and evaluated between a tread surface when new and an internal surface extending in said tread parallel to said tread surface when new,
    said internal surface being in contact radially on the inside with those points of the deepest circumferential grooves that are furthest towards the inside of said tread,
    said middle region having a middle volume void ratio when new that is less than half said total volume void ratio of said tread when new, said middle region comprising a plurality of transverse or oblique sipes opening into said circumferential inner grooves,
    said sipes having a depth at least equal to 75% of the depths of said circumferential grooves, and
    the number of transverse or oblique sipes in said middle region over one complete turn of said tire being greater than the number of transverse or oblique sipes in each of said intermediate and edge regions;
    wherein the intermediate region has an intermediate volume void ratio, and the edge region has an edge volume void ratio;
    wherein the intermediate volume void ratio and the edge volume void ratio are each greater than the middle volume void ratio when the tread is new and part worn;
    wherein the intermediate volume void ratio is greater than the edge volume void ratio when new and part worn;
    wherein the middle region includes a plurality of sipes which are configured to form new grooves after a predetermined amount of wear such that middle volume void ratio increases from when the tread is new to when the tread has experienced the predetermined amount of wear; and
    wherein the intermediate void volume ratio and the edge volume void ratio both decrease from when the tread is new to when said tread has experienced the predetermined amount of wear.

2. The tread as set forth in claim 1, wherein each intermediate region is provided with a plurality of transverse or oblique sipes, said sipes of said intermediate regions having a depth at least equal to 75% of the depths of said circumferential grooves, with a mean spacing Pi, a mean spacing Pm of said sipes of said middle region being less than said mean spacing Pi.

3. The tread as set forth in claim 1, wherein said edge regions have no transverse or oblique sipes.

4. The tread as set forth in claim 1, wherein said edge regions are provided with transverse or oblique sipes at a mean spacing Ps, said mean spacing Ps being greater than said mean spacing Pm of said sipes in said middle region.

5. The tread as set forth in claim 1, wherein said mean spacing Pi of said sipes in each intermediate region is at least greater than 1.2 times said mean spacing Pm of said sipes in said middle region.

6. The tread as set forth in claim 1, wherein said volume void ratio of said tread when new is less than 13% and said volume void ratio of said middle region when new is at most equal to 6%.

7. A tire comprising a tread according to claim 1, wherein said tire is configured to be fitted to a drive axle of a heavy vehicle.

8. The tread as set forth in claim 1, wherein said middle region has an axial width Lm at least equal to 38% and at most equal to 60% of said total width W of said tread.

9. A tread for a heavy vehicle tire,
    said tread having a total axial width W and a wearable thickness PMU of material,
    said tread being provided with at least four grooves of circumferential overall orientation on the tread, wherein the at least four grooves are spaced apart axially and disposed on both sides of a midplane that divides said tread axially into two parts of equal width, the at least four grooves including a pair of inner grooves and a pair of outer grooves,
    said at least four grooves of circumferential overall orientation dividing said tread into a middle region, intermediate regions axially on each side of said middle region and edge regions axially delimiting said tread,
    said middle region being defined as a region of said tread situated between the inner grooves, the inner grooves being the two circumferential grooves that are axially most closely spaced on each side of said midplane, said intermediate region including the inner grooves, and said edge regions including the outer grooves,
    said middle region having an axial width Lm at least equal to 35% and at most equal to 60% of said total width W of said tread,
    a total volume void ratio of said tread when new is greater than 10% and less than 17%, said void ratio being calculated as a ratio between a total void volume and a total volume of tread including all voids and evaluated between a tread surface when new and an internal surface extending in said tread parallel to said tread surface when new, said internal surface being in contact radially on the inside with those points of the deepest circumferential grooves that are furthest towards the inside of said tread, said middle region having a middle volume void ratio when new that is less than half said total volume void ratio of said tread when new, said middle region comprising a plurality of transverse or oblique sipes opening into said circumferential inner grooves, said sipes having a depth at least equal to 75% of the depths of said circumferential grooves, and said intermediate and edge regions having no transverse or oblique sipes at all;

wherein the intermediate region has an intermediate volume void ratio, and the edge region has an edge volume void ratio;

wherein the intermediate volume void ratio and the edge volume void ratio are each greater than the middle volume void ratio when the tread is new and part worn;

wherein the intermediate volume void ratio is greater than the edge volume void ratio when new and part worn.

10. The tread as set forth in claim 9, wherein said volume void ratio of said tread when new is less than 13% and said volume void ratio of said middle region when new is at most equal to 6%.

11. A tire comprising a tread according to claim 9, wherein said tire is configured to be fitted to a drive axle of a heavy vehicle.

12. The tread as set forth in claim 9, wherein said middle region has an axial width Lm at least equal to 38% and at most equal to 60% of said total width W of said tread.

* * * * *